Feb. 23, 1932. W. R. HOWARD Re. 18,357
PROCESS FOR TREATING HYDROCARBONS
Original Filed Sept. 8, 1919
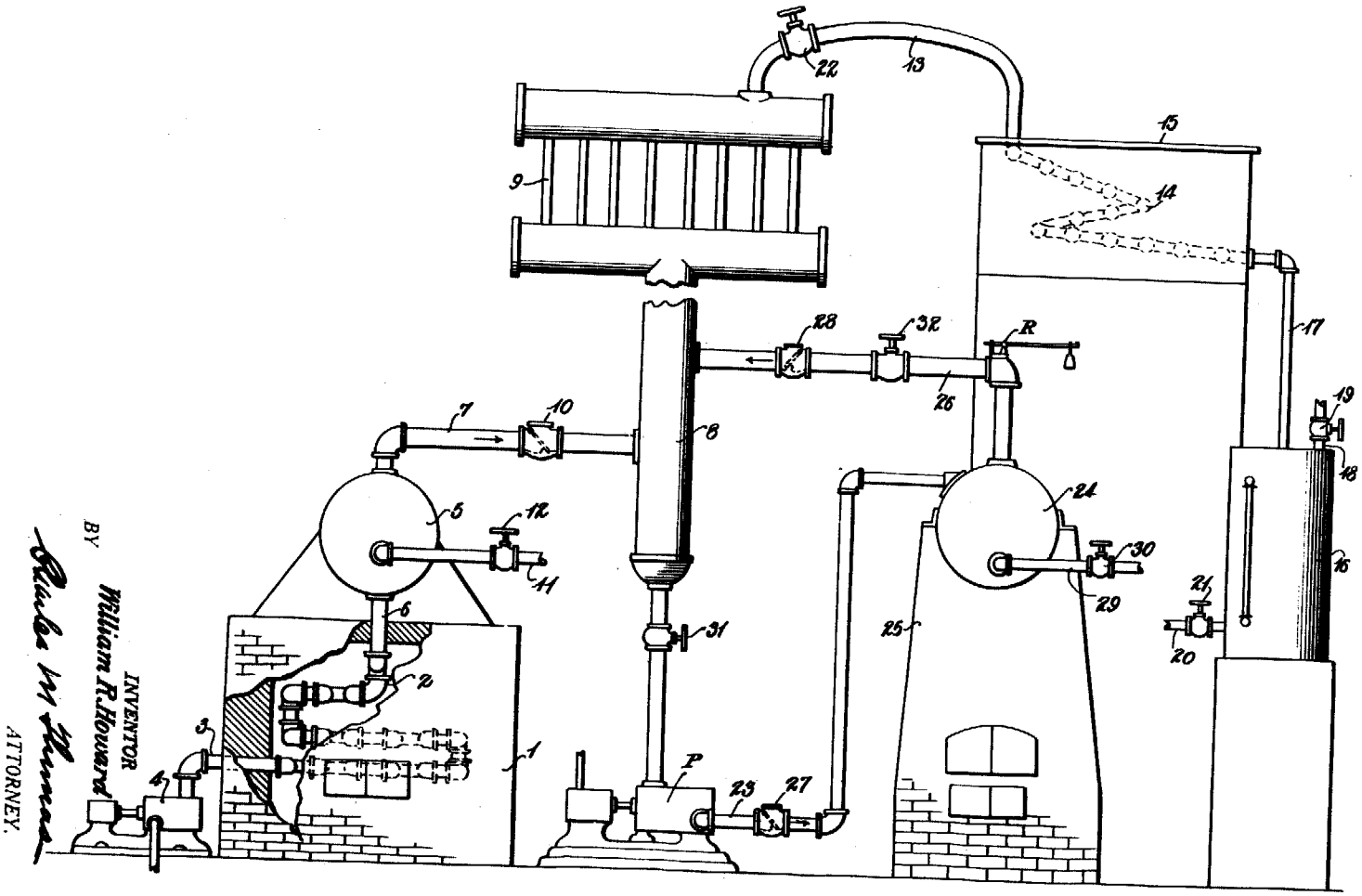
INVENTOR
William R. Howard
BY
Charles W. Thomas
ATTORNEY.

Reissued Feb. 23, 1932

Re. 18,357

UNITED STATES PATENT OFFICE

WILLIAM R. HOWARD, OF WASHINGTON, DISTRICT OF COLUMBIA, ASSIGNOR TO UNIVERSAL OIL PRODUCTS COMPANY, OF CHICAGO, ILLINOIS, A CORPORATION OF SOUTH DAKOTA

PROCESS FOR TREATING HYDROCARBONS

Original No. 1,535,725, dated April 28, 1925. Serial No. 322,457, filed September 8, 1919. Application for reissue filed March 10, 1927. Serial No. 174,342.

This invention relates primarily to the so-called cracking of petroleum oil or in other words, to the conversion of high boiling point to low boiling point hydrocarbons such as gasoline. The process is preferably operated as a continuous one in which the oil passes through a cracking zone to a vapor chamber, thence the vapors are subjected to a reflux condensing action and finally to a water condenser.

In the present invention, the refluxed condensate instead of returning to the original cracking zone is delivered to a separate chamber and revaporized. This prevents the lighter vapors from being over-treated and also prevents carbon from being returned to the primary cracking zone.

As a further feature of the invention, it may be so carried out as to subject the reflux condensate to a different pressure and temperature than that to which the oil is first subjected.

Referring in detail to the drawing, 1 designates a fire box in which is mounted an endless heating coil 2, which forms a cracking zone. Oil is supplied to this coil 2 through pipe 3 from pump 4 from any suitable source of supply. The oil passes into vapor or expansion chamber 5 through pipe 6. The vapors generated pass out through vapor line 7 into the standard 8 of an aerial condenser 9. It is to be noted that the pipe 7 enters the standard 8 at a point above the lower end of the latter and is provided with a check valve 10. The arrangement is such that the vapors can pass through the pipe 7 only in the direction of the arrow. The unvaporized oil is drawn out through the drawoff pipe 11, controlled by valve 12. The heavier vapors in the aerial 9 will condense and fall back into the standard 8. The uncondensed vapors pass out through the gooseneck 13 into coil 14 in water condenser 15. From coil 14 the condensed vapors and incondensable gases pass into receiving tank 16 by means of pipe 17. A gas outlet 18 controlled by valve 19 is provided, as is also a liquid drawoff pipe 20 controlled by valve 21. A valve 22 may also be provided in the gooseneck 13.

The condensed distillates which fall back into the standard 8 pass through line 23 into the secondary still 24. This still 24 is seated in a furnace 25 so that it can be heated. The vapors generated in the still 24 pass out through line 26 into the standard 8 and are subjected to the condensing action of the aerial reflux condensers. Check valves 27 and 28 are interposed in the lines 23 and 26 and so arranged that the oil and vapors can pass through the lines 23 and 26 only in direction of the arrows. A drawoff line 29 leads from the lower end of the still 24 and is provided with valve 30.

As a feature of the invention a pump P is interposed in the line 23 and so arranged as to be able to force the condensed liquid coming from the standard 8 into the secondary still 24. A pressure valve R is interposed in the return line 26.

The oil to be treated may be of any desired character and the pressure and temperature used may be varied within relatively wide limits. The following illustrative run on gas oil from the Kansas may be given. The whole system may be kept under a pressure of say 100 lbs. by controlling the various outlet valves, or if desired, the pressure of 100 lbs. may be maintained on the still 2 and a pressure of 150 lbs. or more maintained on the contents of the still 24. Moreover, the pressure in the still 24 may be raised or lowered by regulating the valve R as the process proceeds; as for example, raised to 200 pounds or lowered to 125 pounds.

The oil temperature in the coil 2 may be 650° F. while the temperature in the still 24 may be 800° F. The reason for this is that the charging stock contains more low boiling point constituents than does the condensate returning to the still 24. It will be seen that the partially cracked refluxed condensate is in effect shuttle cocked, from the aerial to the still 24 and return. It will also be noted that any carbon precipitated in the reflux condensate will go back to the tank and not reach the coil 2. By properly regulating the size of the aerial 9 substantially any end point gasoline may be made. In other words, with a given gas oil the aerial 9 can be of such size that it will be at all times kept at a temperature of 400° F., hence nothing boiling above 400° F. will pass out through the gooseneck 13. It is to be understood that a regulated quantity of oil is constantly fed to the apparatus. The pipes 23 and 26 are provided with valves 31 and 32 whereby the still 24 can be cut out of the system for cleaning if desired.

I claim as my invention:

1. A process of converting relatively heavy hydrocarbons into those of lower boiling point, consisting in passing the oil continuously through a cracking zone, thence to a vapor chamber passing the vapors from said vapor chamber to a reflux condenser, passing the uncondensed portion of the vapors from the reflux condenser to a final condenser and receiving tank, returning the liquid portion condensed in the reflux condenser under forced pressure to a secondary cracking zone, distilling the liquid portion in said zone and again passing the vapors generated to the reflux condenser, continuously retreating the reflux condensate in said secondary cracking zone, maintaining a predetermined superatmospheric vapor pressure on the oil in said first cracking zone, and maintaining a higher vapor pressure on the oil in said secondary cracking zone.

2. A process of converting relatively heavy hydrocarbons into those of lower boiling point, consisting in passing the oil through a cracking zone, thence to a vaporizing zone, passing the vapors from the vapor zone and subjecting them to a refluxing action, passing the uncondensed portion of the vapors to a final condenser and receiving tank and the condensed portion to a secondary cracking zone, causing vapors generated in said latter zone to again pass to the refluxing zone, maintaining a predetermined superatmospheric vapor pressure on the oil in said first cracking zone and maintaining a higher vapor pressure on the oil in said secondary cracking zone.

3. A process of converting relatively heavy hydrocarbons into the lower boiling point hydrocarbons, consisting in passing oil through a cracking coil and thence to a reacting zone, in discharging vapors from the reacting zone to a dephlegmator, in discharging uncondensed vapors from the dephlegmator for condensation and collection, in passing reflux condensate from said dephelgmator to a second still for treatment, in maintaining an increased pressure and temperature in said second still, and in introducing the vapors from said second still to said dephlegmator.

4. A process of converting relatively heavy hydrocarbons into the lower boiling point hydrocarbons, consisting in passing oil through a cracking coil and thence to a reacting zone, in discharging vapors from the reacting zone to a dephlegmator, in discharging uncondensed vapors from the dephlegmator for condensation and collection, in passing reflux condensate from said dephlegmator to a second still for treatment, in maintaining an increased pressure and temperature in said second still, in introducing th vapors from said second still to said dephlegmator, and in maintaining a superatmospheric pressure on the oil undergoing distillation in each still.

5. An oil conversion process consisting in subjecting charging oil to cracking conditions of temperature and pressure sufficient to convert a substantial portion of said oil into gasoline-like materials without substantially overheating the lighter fractions of the gasoline thus produced, in removing unvaporized residue from said cracking operation, in separating the vapors generated into a light gasoline-like material and a heavier refractory condensate, in continuously subjecting said refractory condensate to a substantially increased temperature and pressure while maintained in an independent heating zone wholly segregated from the unvaporized fractions of said charging oil and in which zone a pool of such condensate undergoes cracking.

6. An oil converting process consisting in subjecting charging oil to cracking conditions of temperature and pressure sufficient to convert a substantial quantity of said oil without overcracking the light gasoline fractions produced therefrom, in removing the unvaporized residue of such cracking operation, in separating the light sufficiently cracked gasoline-like vapors from the insufficiently cracked vapors to form from the latter a refractory condensate, in subjecting said condensate to a temperature and pressure exceeding the temperature and pressure maintained on the charging oil and sufficient to convert said refractory material into light gasoline-like constituents while a substantial portion of such condensate is in a liquid condition and while the condensate is maintained isolated from the unvaporized charging oil, and in collecting the light gasoline-like constituents produced from both the charging oil and the reflux condensate to form a gasoline-like material.

7. An oil converting process consisting in subjecting charging oil to a cracking temperature while under a pressure of at least 100 pounds per square inch to convert a substantial portion of said oil, in removing the unvaporized residue of such conversion, in subjecting the vapors generated to reflux condensation to separate the heavy from the lighter vapors, and in subjecting a body of the reflux condensate to a temperature substantially above the temperature to which the charging oil is subjected and to a pressure of not less than 125 pounds per square inch while said condensate is wholly segregated from the unvaporized residue, and in collecting the products of such conversion.

8. A method of making gasoline which consists in subjecting charging oil to cracking conditions of temperature and pressure to convert the oil to produce hydrocarbon substances containing gasoline and heavier fractions, in separating the heavier fractions from the lighter gasoline-like products thereby producing a refractory distillate, and in subjecting such distillate to a substantially increased temperature and pressure in an independent cracking zone where the distillate is segregated from the unvaporized fractions of the charging oil and in which zone a liquid body of said distillate undergoes cracking.

9. An oil conversion process consisting in subjecting charging oil to cracking conditions of temperature and pressure sufficient to convert a substantial portion of said oil into gasoline-like materials, in separating the products of conversion into a light gasoline-like material and a heavier refractory distillate, in continuously subjecting said refractory distillate to a substantially increased condition of temperature and pressure while the distillate is maintained wholly segregated from the unvaporized fractions of the charging oil and a substantial portion thereof is in liquid condition while it is undergoing cracking and in recovering the gasoline-like products of such conversion.

10. An oil conversion process consisting in subjecting charging oil to a cracking temperature while under a pressure of at least 100 pounds per square inch to convert a substantial quantity of such oil into lighter products, in separating such lighter products into gasoline-like fractions and a heavier refractory oil, and in subjecting a body of said heavier refractory oil to a temperature above the temperature to which the charging oil is subjected and a pressure of not less than 125 pounds per square inch while such refractory material is segregated from the unvaporized residue of the charging oil and in collecting the products of conversion.

11. A method of making gasoline which consists in subjecting charging oil to cracking conditions of temperature and a superatmospheric pressure to convert the oil to produce hydrocarbon substances containing gasoline and heavier fractions, in separating the heavier fractions from the lighter gasoline-like products thereby producing a refractory distillate, and in subjecting a liquid body of such distillate to a cracking temperature while under a substantially increased pressure in an independent cracking zone where the distillate remains segregated from the unvaporized fractions of the charging oil.

12. An oil conversion process consisting in subjecting charging oil to cracking conditions of temperature and super-atmospheric pressure sufficient to convert a substantial portion of said oil into gasoline-like materials, in separating the products of conversion into a light gasoline-like material and a heavier refractory distillate, in continuously subjecting said refractory distillate to a cracking temperature while a substantial portion thereof is maintained in a liquid condition by a superatmospheric pressure substantially exceeding the pressure maintained on the charging oil, and in maintaining such distillate segregated from the unvaporized fractions of the charging oil during the conversion thereof, and in recovering the products of conversion.

13. An oil conversion process consisting in subjecting charging stock to a cracking temperature while under a pressure of at least one hundred pounds per square inch to convert a substantial quantity of such oil into lighter products, in separating the products of conversion into a light gasoline-like material and a heavier refractory distillate, and in subjecting a body of said distillate in a liquid condition to a cracking temperature while under a pressure of not less than a hundred and twenty-five pounds per square inch and while such distillate is segregated from the unvaporized residue of the charging stock.

14. A process for cracking hydrocarbon oil comprising continuously advancing a stream of charging oil through a heating zone where it is subjected to a cracking temperature and thence delivered to an enlarged zone, maintaining a superatmospheric pressure on said oil stream and in the enlarged zone, in continuously removing vapors generated from the oil from the enlarged zone while withdrawing unvaporized oil from such enlarged zone to maintain the vapors produced of a substantially uniform composition throughout the normal run of the process, in condensing heavier vapors without condensing the lighter gasoline-like vapors, thereby producing a refractory distillate of substantially uniform composition, and in continuously subjecting such distillate to a cracking temperature substantially greater than the temperature to which the charging oil is initially heated while maintained in an independent cracking zone segregated from the initial charging oil undergoing conversion to convert substantial portions of said distillate into gasoline-like products.

15. A process for cracking hydrocarbon oils comprising continuously supplying charging oil to an initial cracking zone to be subjected to a cracking temperature while maintained under a superatmospheric pressure to volatilize a substantial portion thereof forming gasoline-like materials and products heavier than gasoline in maintaining the products of conversion of a substantially uniform composition by removing from the initial cracking zone the unvaporized fraction of the charging oil, in separating the converted volatile products into light gasoline-like material and a heavier refractory distillate, and in continuously subjecting said refractory distillate, of a substantially uniform composition, to a cracking temperature exceeding the temperature to which the charging oil is initially heated while maintained segregated from the charging oil in the initial cracking zone whereby substantial portions of said refractory distillate are converted into additional gasoline-like products.

16. A process for cracking hydrocarbon oil comprising continuously supplying charging oil to be converted to an initial cracking zone where it is subjected to a cracking temperature while maintained under a superatmospheric pressure, in continuously removing from said cracking zone constituents volatilizing at the temperature and pressure maintained therein, in removing from said initial cracking zone unvaporized fractions of the charging oil to maintain the volatile products produced therein of substantially uniform composition during the normal operation of the process, in continuously subjecting the volatilized products to partial condensation to separate gasoline-like products from the less volatile constituents, in continuously subjecting the less volatile constituents thus obtained to an independent cracking temperature substantially exceeding the temperature maintained in the initial cracking zone while retaining such distillate segregated from the charging oil undergoing conversion in the initial cracking zone to convert additional quantities of said distillate into gasoline-like products.

17. A process for cracking hydrocarbon oil comprising initially subjecting charging oil to a cracking reaction by continuously advancing a stream of charging oil through a heating coil to be heated therein to a cracking temperature, in transferring such oil to an enlarged chamber, in maintaining a superatmospheric pressure on the oil undergoing treatment, in separating the volatilized products of conversion into a light gasoline-like material and a heavier refractory distillate, the composition of which is substantially uniform during the operation of the process, in continuously subjecting such refractory distillate of substantially uniform composition to a temperature substantially exceeding the temperature to which the charging stock is initially heated while maintaining said refractory distillate during its conversion under such increased temperature segregated from the charging oil undergoing its initial cracking, and in recovering the products of such conversion.

18. A process for cracking hydrocarbon oil comprising continuously supplying charging oil to be converted to an initial cracking zone where it is subjected to a cracking temperature while maintained under superatmospheric pressure, in continuously removing from the heated oil volatilized constituents leaving the oil at the temperature and pressure employed in the initial cracking zone, in removing from the cracking zone unvaporized products to maintain the volatilized products produced therein of substantially uniform composition, in separating such volatilized products into a light gasoline-like material and a heavier refractory distillate, the composition of which remains substantially uniform during the operation of the process, and in continuously subjecting such distillate to a cracking temperature while under a substantially increased pressure in an independent cracking zone where the distillate remains segregated from the charging oil undergoing conversion in the initial cracking zone.

WILLIAM R. HOWARD.

DISCLAIMER

Re. No. 18,357.—*William R. Howard*, Washington, D. C. PROCESS FOR TREATING HYDROCARBONS. Patent dated February 23, 1932. Disclaimer filed July 22, 1938, by the patentee; the assignee, *Universal Oil Products Company*, approving and concurring.

Hereby enters this disclaimer to the subject matter constituting claims 11, 12, and 13 of said reissue patent.

[*Official Gazette August 16, 1938.*]